US006297488B1

(12) United States Patent
Beraldin et al.

(10) Patent No.: US 6,297,488 B1
(45) Date of Patent: Oct. 2, 2001

(54) POSITION SENSITIVE LIGHT SPOT DETECTOR

(75) Inventors: J. Angelo Beraldin, Ottawa; Francois Blais, Orleans; Marc Rioux, Ottawa; Jacques Domey, Gloucester, all of (CA)

(73) Assignee: National Research Council of Canada, Ottawa (CA)

( * ) Notice: Subject to any disclaimer, the term of this patent is extended or adjusted under 35 U.S.C. 154(b) by 0 days.

(21) Appl. No.: 09/300,445

(22) Filed: Apr. 29, 1999

(51) Int. Cl.⁷ .............................. G02B 7/04; G01B 11/24
(52) U.S. Cl. ..................... 250/201.2; 250/201.5; 356/602; 356/3.02
(58) Field of Search ......................... 250/559.38, 201.2, 250/201.5, 214.1, 208.1; 356/602, 600, 3.01, 3.02, 4.01

(56) References Cited

U.S. PATENT DOCUMENTS

| | | |
|---|---|---|
| 3,209,201 | 9/1965 | Anger . |
| 4,593,967 | 6/1986 | Haugen . |
| 4,634,879 | 1/1987 | Penney . |
| 4,658,368 | 4/1987 | Blais . |
| 4,819,197 | 4/1989 | Blais . |
| 4,828,384 | 5/1989 | Plankenhorn et al. . |
| 4,950,878 | 8/1990 | Ulich et al. . |
| 5,177,556 | 1/1993 | Rioux . |
| 5,198,877 | 3/1993 | Schulz . |
| 5,313,542 | 5/1994 | Castonguay . |
| 5,353,073 | 10/1994 | Kobayashi . |
| 5,424,835 | 6/1995 | Cosnard et al. . |
| 5,430,472 | 7/1995 | Curry . |
| 5,513,276 | 4/1996 | Theodoracatos . |
| 5,640,246 | 6/1997 | Castonguay . |
| 5,726,443 | * 3/1998 | Immega et al. ............... 250/208.1 |
| 5,754,690 | * 5/1998 | Jackson et al. .............. 382/199 |
| 5,790,699 | * 8/1998 | Jackson et al. .............. 382/199 |

FOREIGN PATENT DOCUMENTS 37 09 614 A1   10/1988  (DE) .

OTHER PUBLICATIONS

F. Blais and M. Rioux, "Real–Time Numerical Peak Detector", *Signal Process*, 11(2), Jan. 1986, pp. 145–155.

A. Makynen et al., "High Accuracy CMOS Position Sensitive Photodetector (PSD)", *Electronics Letters*, vol. 33, No. 2, Jan. 1997, pp. 128–130.

A. Makynen and J. Kostamovaara, "Linear and Sensitive CMOS Position–Sensitive Photo–detector", *Electronics Letters*, vol. 34(12), Jun. 1998, pp. 1255–1256.

"Large Area Sensor Technology—LAE", Heimann, Heimann GmbH, Weher Koppel 6, D–6200, Wiesbaden, West Germany.

Mäkynen, Anssi et al., "A binary photodetector array for position sensing", *Sensors and Actuators A*, CH, Elsevier Sequoia S.A., Lausanne, vol. 65, No. 1, Feb. 1998, pp. 45–53.

\* cited by examiner

*Primary Examiner*—F. L. Evans
*Assistant Examiner*—Zandra V. Smith

(57) ABSTRACT

The present invention provides a method and an apparatus for detecting a position of a light spot in a light distribution that can include stray light components (e.g. from other lasers, ambient lighting etc.) The apparatus includes a continuous response position sensitive detector (CRPSD, e.g. lateral effect photo-iode) for determining a first centroid of the light distribution and a discrete response position sensitive detector (DRPSD, e.g. multiplexed array) for determining a second centroid of the light distribution within a reading window defined about the first centroid and within the light distribution. The second centroid represents the position of the light spot in the light distribution. This multiple stage approach exploits the high resolution and speed offered by traditional CRPSDs together with the accuracy under variable lighting conditions offered by traditional DRPSDs.

18 Claims, 12 Drawing Sheets

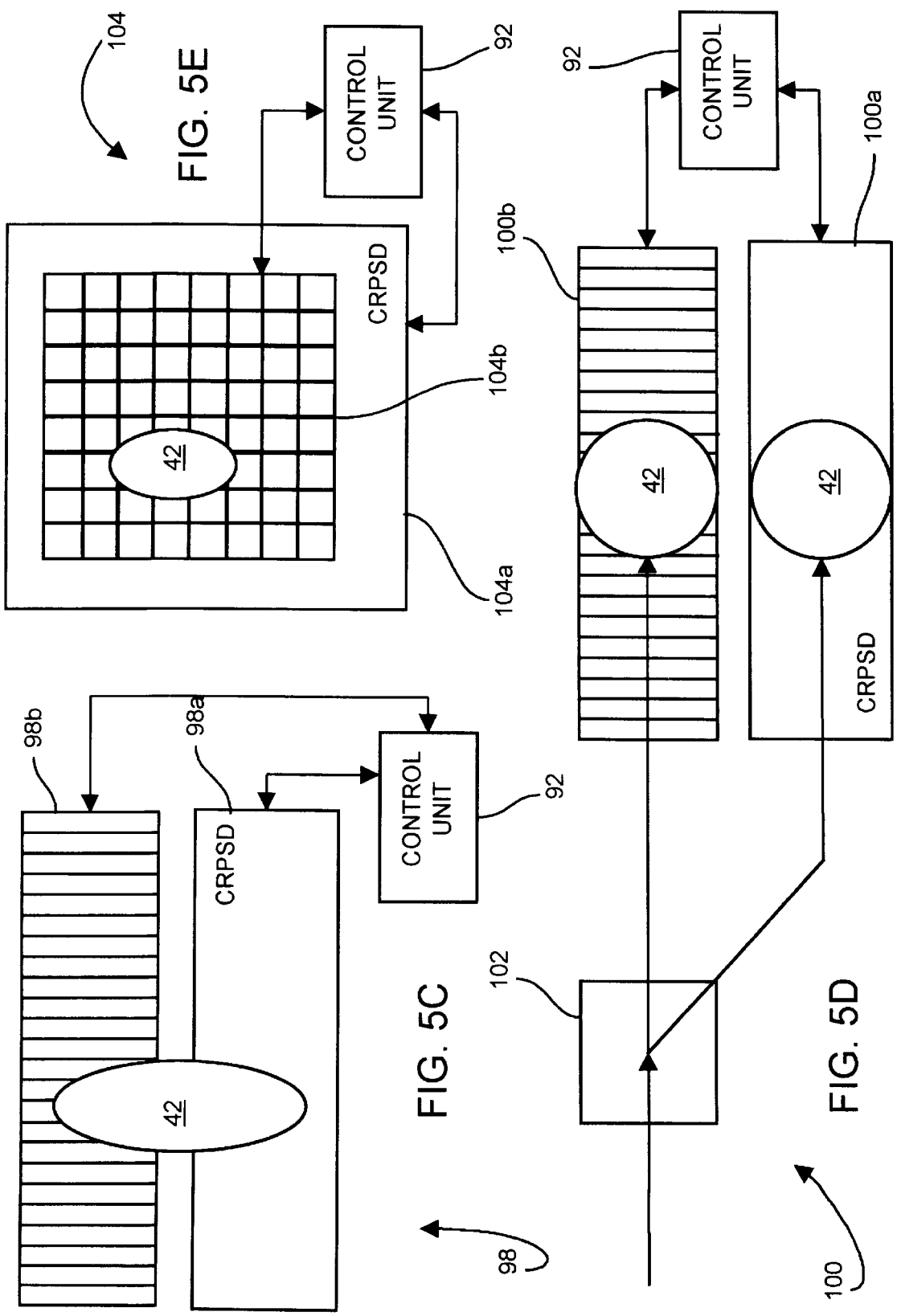

POSITION SENSITIVE LIGHT SPOT DETECTOR

FIELD OF THE INVENTION

This invention relates to the field of position sensitive light spot detectors for single or multiple wavelengths (e.g. colour RGB) arranged as points, lines (straight or curved) or grids such as for use in range cameras.

BACKGROUND OF THE INVENTION

The optical measurement of light spot position is used in many robotic control and vision systems. Range cameras, used for three dimensional (3D) imaging, exploit geometric arrangements (such as active optical triangulation), properties of light propagation, and light interference to extract distance shape. Optical triangulation relies on the measurement of the position of a focused light beam impinging on a linear or bi-dimensional sensor.

FIG. 1 illustrates a basic light position measurement system 10 according to the prior art. The system includes a lens 12 for receiving light beams 14a,b generated from a projected beam 16. An optical position sensor 18 receives the light beams 14a,b after passing through the lens 12 emanating from the intersection of the projected beam 16 with a reflective surface at 19a and 19b.

Optical triangulation is based on the sine law where the knowledge of two angles of a triangle and one side fully determines its dimensions. As shown in FIG. 1, two known angles $_1$, and $_2$ of a triangle 20 (bounded by the projected beam 16, the collected beam 14a and a baseline 22) are the angles of the projected beam 16 and the collected beam 14a relative to the baseline 22, respectively. The angle $_2$ of the collected beam 14a is measured using the lens 12 and the optical position sensor 18 that measures a length L as the distance between the collected means 14a,b on the sensor 18. The length L is related to the angle $_2$ and therefore a displacement Z based on the sine law as discussed above.

Many devices have been proposed in the prior art for measuring the position of the collected light beams. The devices generally belong to one of two main groups: continuous response position sensitive detectors (CRPSD) and discrete response position sensitive detectors (DRPSD).

A CRPSD is defined as a class of position sensitive detectors that determinelcalculate the centroid of a light distribution, which may include stray light components in addition to a desired light spot. A DRPSD is defined as a class of position sensitive detectors that samples and analyses the entire light distribution to determine the position of the desired light spot within the light distribution.

CRPSD are generally based on lateral effect photodiodes and geometrically shaped photo-diodes (wedges or segmented) such as disclosed in A. Makynen and J. Kostamovaara, *Linear and sensitive CMOS Dosition sensitive photodetector*, Electronics Letters, Vol. 34 (12), pp. 1255–1256, Jun. 1998 and in A. Makynen et al., *High accuracy CMOS position sensitive Photodetector (PSD)*, Electronics Letters, Vol. 33 (21), pp.128–130, Jan. 1997.

DRPSD are generally implemented using an array of photosensors where they are read out serially by metal oxide semiconductor field effect transistor (MOSFET) switches or a charge coupled device (CCD) such as disclosed in F. Blais and M. Rioux, *Real-Time Numerical Peak Detector*, Signal Process., 11(2), 145–155 (1986).

CRPSD are known to measure the centroid of a light distribution impinging on its resistive surface to a very high level of resolution and speed. However, accuracy is reduced when spurious light is present together with the main light distribution. DRPSD can achieve, with a peak detection algorithm, higher accuracy levels since the distribution is sampled and hence available for processing but at a slower speed relative to a CRPSD.

Consequently, there is a need for a position sensitive detector that provides high resolution and speed, as offered by traditional CRPSD, together with high accuracy under variable light conditions, as offered by traditional DRPSD.

SUMMARY OF THE INVENTION

An object of the present invention is to provide an improved position sensitive light spot detector.

Another object of the present invention is to provide a position sensitive light spot detector capable of determining the centroid of a desired light spot under variable lighting conditions.

In accordance with one aspect of the present invention there is provided an apparatus for detecting a position of a light spot in a light distribution comprising: (a) means for determining a first centroid of the light distribution; and (b) means for determining a second centroid of the light distribution within a reading window defined about the first centroid and within the light distribution, said second centroid being the position of the light spot in the light distribution.

In accordance with another aspect of the present invention there is provided a method of detecting the position of a light spot in a light distribution comprising the steps of: (a) calculating a first centroid of the light distribution; (b) determining a reading window defined about the first centroid and within the light distribution; and (c) calculating a second centroid of the light distribution within the reading window, said second centroid being the position of the light spot in the light distribution.

BRIEF DESCRIPTION OF THE DRAWINGS

The present invention will be described in conjunction with the drawings in which:

FIGS. 5A, 5B, 5C, 5D and 5E are schematic representations of position sensitive light spot detectors for single wavelengths according to embodiments of present invention;

DETAILED DESCRIPTION OF EMBODIMENTS OF THE INVENTION

Figure 1:
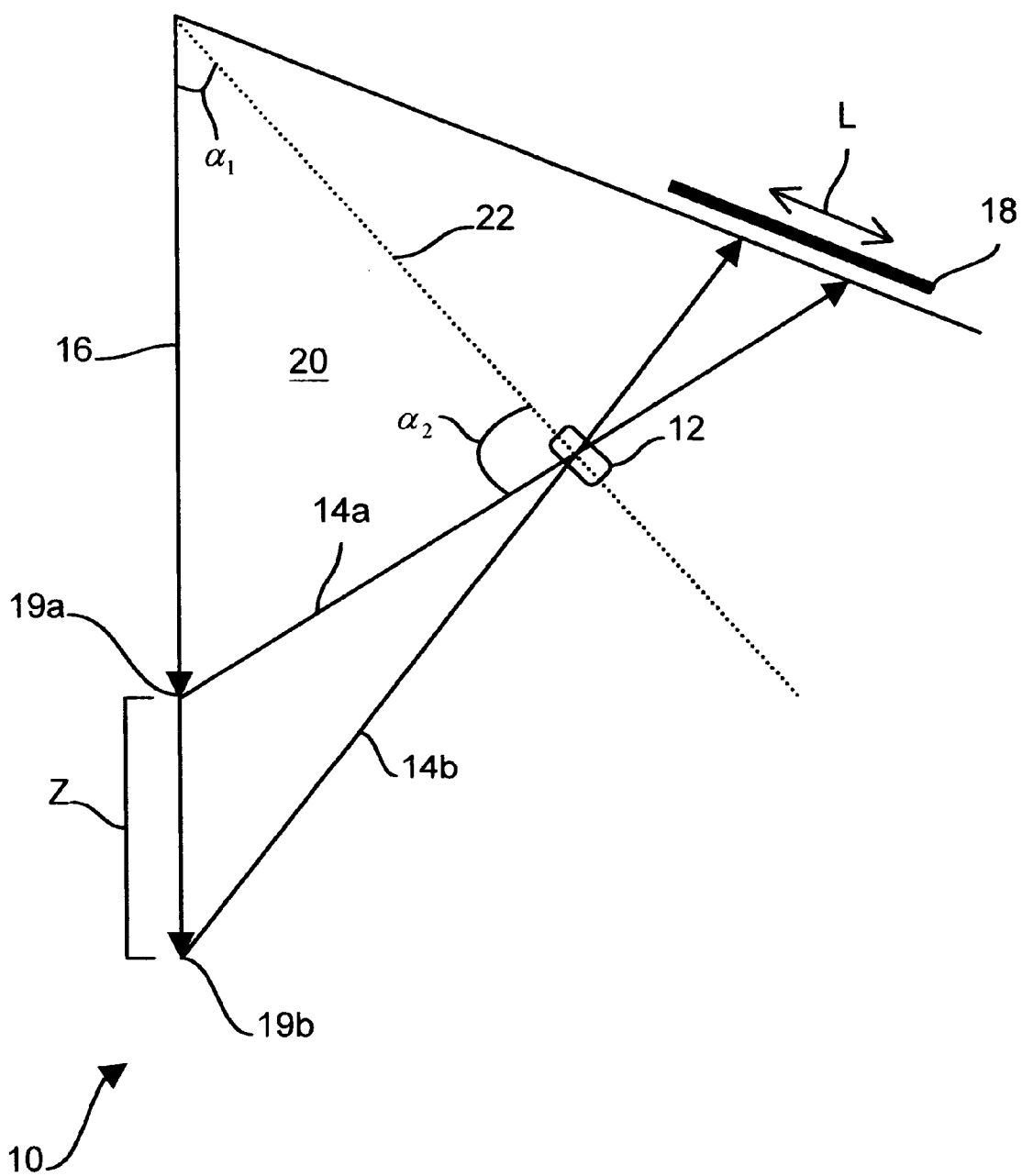
FIG. 1 is a schematic representation illustrating the concept of optical triangulation according to the prior art.
Figure 2:
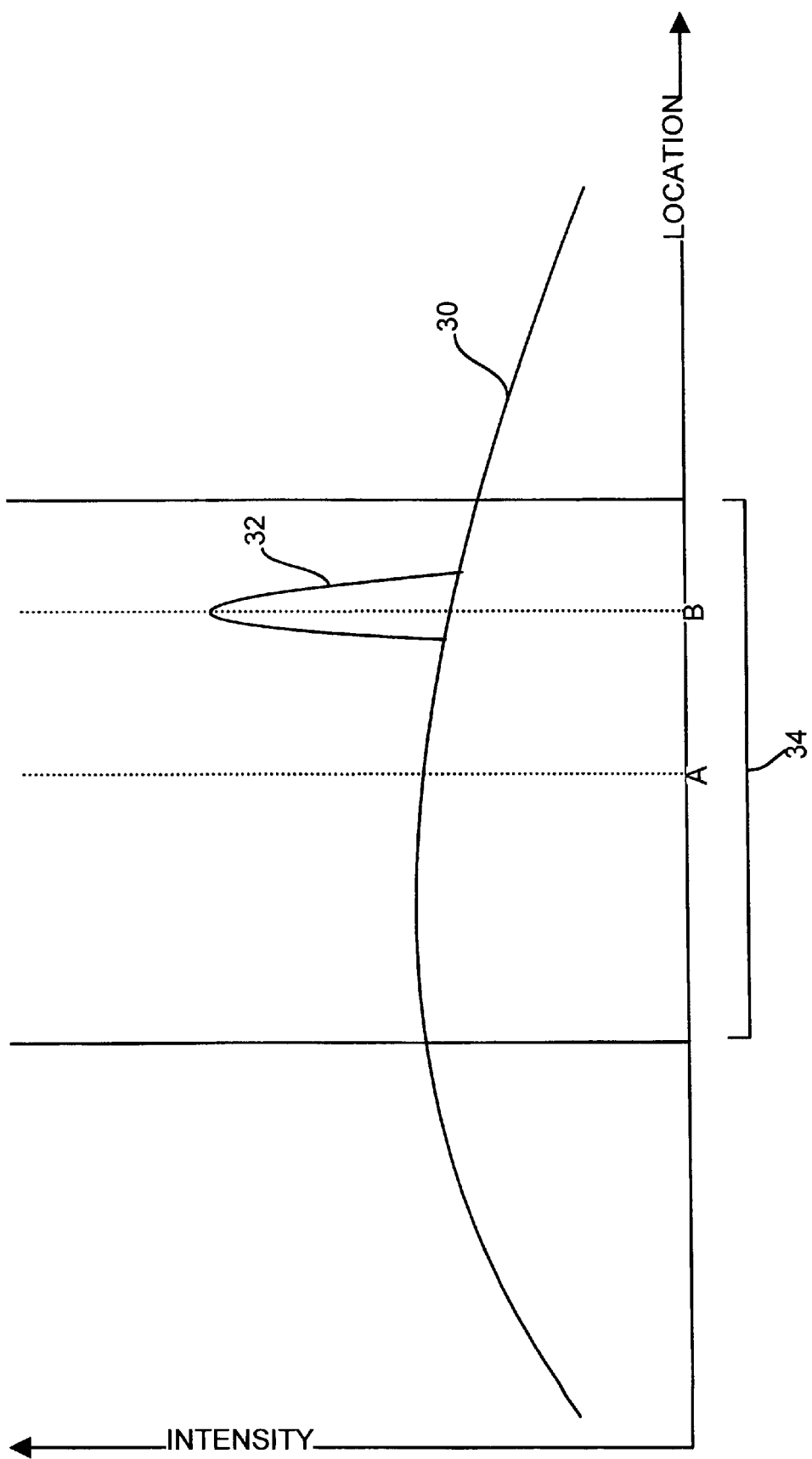
FIG. 2 is a schematic representation of a typical light profile collected on a position sensor to illustrate the concept of the present invention.

FIG. 2 illustrates a schematic representation for a typical light profile collected on the light spot position sensor 18 plotted as intensity versus location. Two profiles are shown for illustration purposes: a background profile 30 that includes background and stray light and a desired light spot 32. This example shows a typical situation where stray light 30 blurs the measurement of the real, much narrower, light spot 32. The concept can be extended to multiple spots or lines.

A typical CRPSD would provide A as a solution, which is a very precise measurement of the centroid of the combined light distribution (i.e. 30 and 32). A typical DRPSD would provide B as a solution, which is a very accurate measurement of the desired light spot 32 given that the discrete method has knowledge of the entire distribution. However, the discrete methods are slow since all the pixels of the array have to be read even though they do not all contribute to the computation of the peak.

In general, the present invention provides a sensor that exploits the speed of a CRPSD with the accuracy of a DRPSD to obtain a sensor that can compute the location of the desired peak very accurately and at a high speed. As illustrated schematically in FIG. 2, the present invention uses a CRPSD to obtain an initial estimate (point A) of the desired light spot 32 then uses a DRPSD, within a reading window 34 of the total light distribution, to obtain a final solution (point B).

Continuous Response Position Sensitive Detectors

Figure 3A:
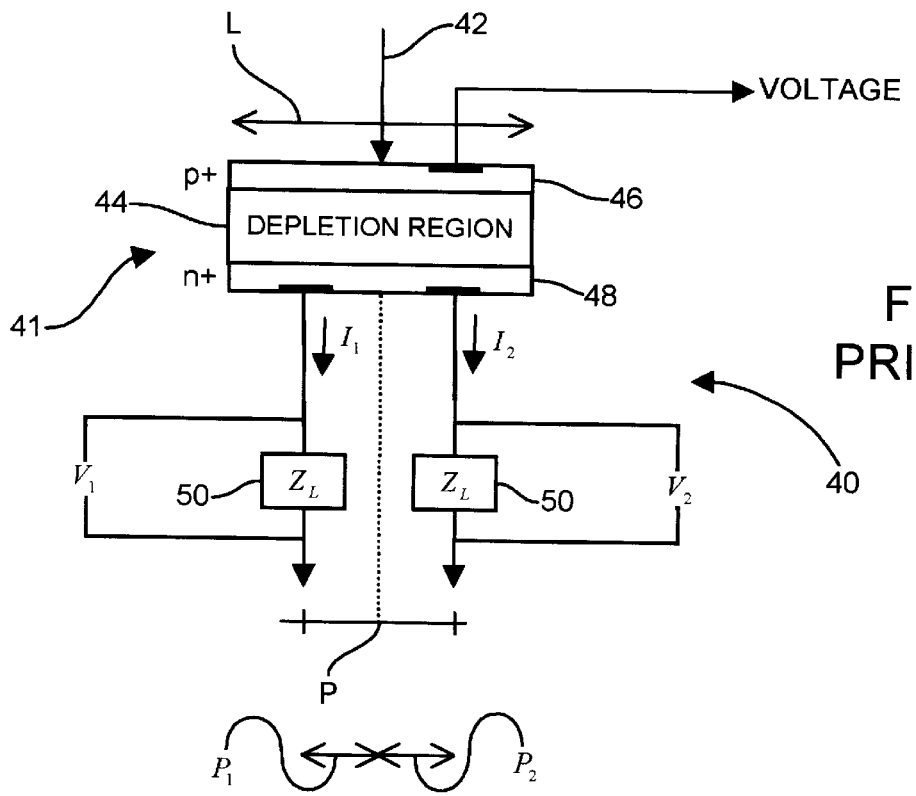
FIGS. 3A, 3B and 3C are schematic representations of typical continuous response position sensitive detectors according to the prior art.

FIG. 3A illustrates a typical prior art CRPSD 40 comprising a lateral effect photo-diode 41 and load impedances ($Z_L$) 50. The detector 40 is a single-axis position detector. Carriers produced by incident light 42 impinging on the photo-iode 41 are separated in a depletion region 44, positioned between a p+ layer 46 and an n+ layer 48, and distributed to a pair of electrodes 49a,b. The electrode 49a/b that is farthest from the centroid of the light distribution gets the least current according to Ohm's law. $I_1$ is the photo-current associated with electrode 49a and $I_2$ is the photo-current associated with the electrode 49b.

The normalized position P of the centroid of the incident light 42 distribution is given by equation (1):

$$P = \frac{I_2 - I_1}{I_1 + I_2}, \quad P \in [-1, 1] \tag{1}$$

where $I_1$ and $I_2$ are photo-currents measured with a pair of load impedances ($Z_L$) 50 or with transimpedance amplifiers (not shown). The actual position on the detector 40 is found by multiplying the above equation by L/2 where L is the length of the depletion region 44. The total photocurrent $I_{ph}$ is given by equation (2):

$$I_{ph} = I_1 + I_2 = P_{det} R \tag{2}$$

where $P_{det}$ is the power of the incident light 42 and R is the responsivity of the photo-diode 41.

The frequency response of the photo-iode 41 can be affected by two main types of phenomena: (1) transit-time effects, which arise from the delay between the absorption of the incident light 42 and the separation of photo-excited electron pairs and (2) the inherent electrical characteristics of the detector 40.

For example, if the maximum required bandwidth for range finding applications is less than 4 MHz, the distributed resistance and capacitance of the lateral effect photo-diode 41 and the load impedances ($Z_L$) 50 dominate the transient behavior of the position detector 40. The bandwidth $f_{LEP}$ of a lateral effect photo-diode 41 can be estimated using equation (3).

$$f_{LEP} = \frac{\pi}{2} \frac{1}{R_p C_j} \tag{3}$$

where $R_p$ is the inter-electrode resistance and $C_j$ the junction capacitance.

The rise time of the current is dependent on the position of the incident light 42. The rise time increases as the distance from a particular contact increases. The effective combination resistance-capacitance increases as the distance from the load resistance increases.

The mathematical description above (in equations (1)–(3)) can be extended to a bi-dimensional CRPSD where four currents are generated and a similar ratio is computed.

For a steady-state excitation, the voltage across each load impedance ($Z_L$) 50 (e.g. resistor) is defined by equations (4 and 5):

$$V_1 = R I_1 (x/L) = I_{ph} R_p 1 - \frac{\frac{R_p/R}{(1+R_p/R)} \frac{x}{L}}{R_p/R + \frac{R_p/R}{(1+R_p/R)}} \tag{4}$$

$$V_2 = R I_2 = R I_1 \left(1 - \frac{x}{L}\right) \tag{5}$$

where $I_{ph}$ is the total photocurrent intensity, x varies between O and L, $R_p$ is the positioning resistance and R is a resistive load derived from $Z_L$.

For $R_p/R \ll 1$ the photoeffect vanishes and for $R_p/R \gg 1$, $V_1$ is calculated from equation (6):

$$V_1 \cong \left(1 - \frac{x}{L}\right) R I_{ph} \tag{6}$$

Equation (1) is the centroid of the photocurrent distribution, which can also be represented in another form by equation (7):

$$x_c = \frac{\int_0^L x I(x) dx}{I_{ph}} \tag{7}$$

where I(x) is the light distribution impinging on the detector 40.

After the two photo-currents $I_1$, and $I_2$ generated by the lateral effect photo-diode 41 have been converted to voltages $V_1$ and $V_2$, the reflectance and depth maps can be calculated using equations (1) and (2), respectively.

The received light intensity is given by equation (8):

$$\text{Intensity} = K(V_1 + V_2) \text{Watts} \quad (8)$$

where K is a function of the voltage gains in the signals path, the trans-impedance gain in ohms (Ω) and the sensitivity of the lateral effect photo-diode 41 in amp/Watts.

Depth measurements are obtained using spot position calculations defined in equations (9) and (10):

$$P_1 = \frac{V_1 - V_2}{V_1 + V_2} \quad (9)$$

$$P_2 = \frac{V_1}{V_1 + V_2} \quad (10)$$

Equation 10 can be solved using analog division or signal compression well known in the art and briefly described below.

Analog Division: An analog divider is a device capable of producing an output voltage or current proportional to the ratio of two analog signals: Z=X/Y. Commercially available dividers are generally classified into three categories: (a) log/antilog; (b) inverted variable transconductance multiplier; and (c) variable transconductance divider.

Signal Compression: Signal compression is a means by which signals that have very large dynamic range can be compressed. By doing so, analog to digital convertors with a reduced number of bits can be used and hence higher data rates can be achieved. This technique assumes that the probability density function of the signal to be compressed is concentrated around its expected value. Compression can be accomplished through the use of logarithmic amplifiers or non-linear A/D conversion techniques well known in the art.

Figure 3B:
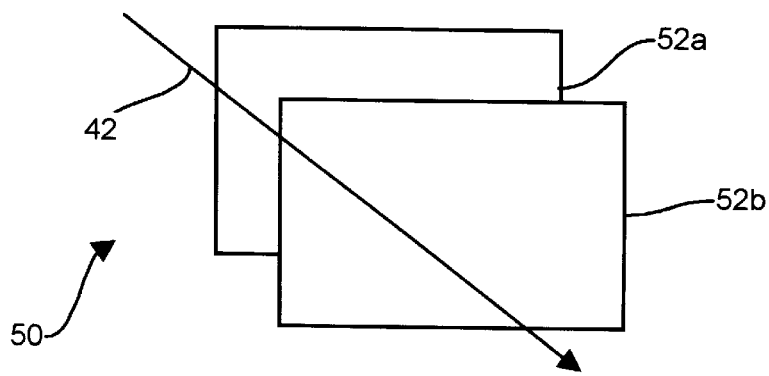

FIG. 3B illustrates a transparent lateral effect photo-diode CRPSD 50 according to the prior art. The same principles as FIG. 3A apply, however, the incident light beam 42 is allowed to pass through a first sensor 52a to a second sensor 52b. A type of transparent detector 50 is manufactured by Heimann GmbH in Germany.

Figure 3C:
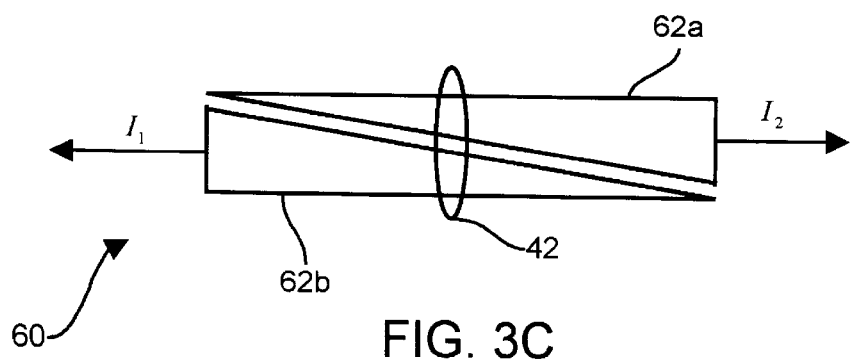

FIG. 3C illustrates a split sensor based CRPSD 60 according to the prior art. The split sensor 60 includes a pair of spaced apart wedges 62a and 62b to reduce the channel thermal noise of the detector 40 of FIG. 3A. An example of a split sensor is disclosed in U.S. Pat. No. 3,209,201 issued on Jun. 17, 1960 titled "Beam Position Identification Means" incorporated herein by reference.

Discrete Response Position Sensitive Detectors

Figure 4A:
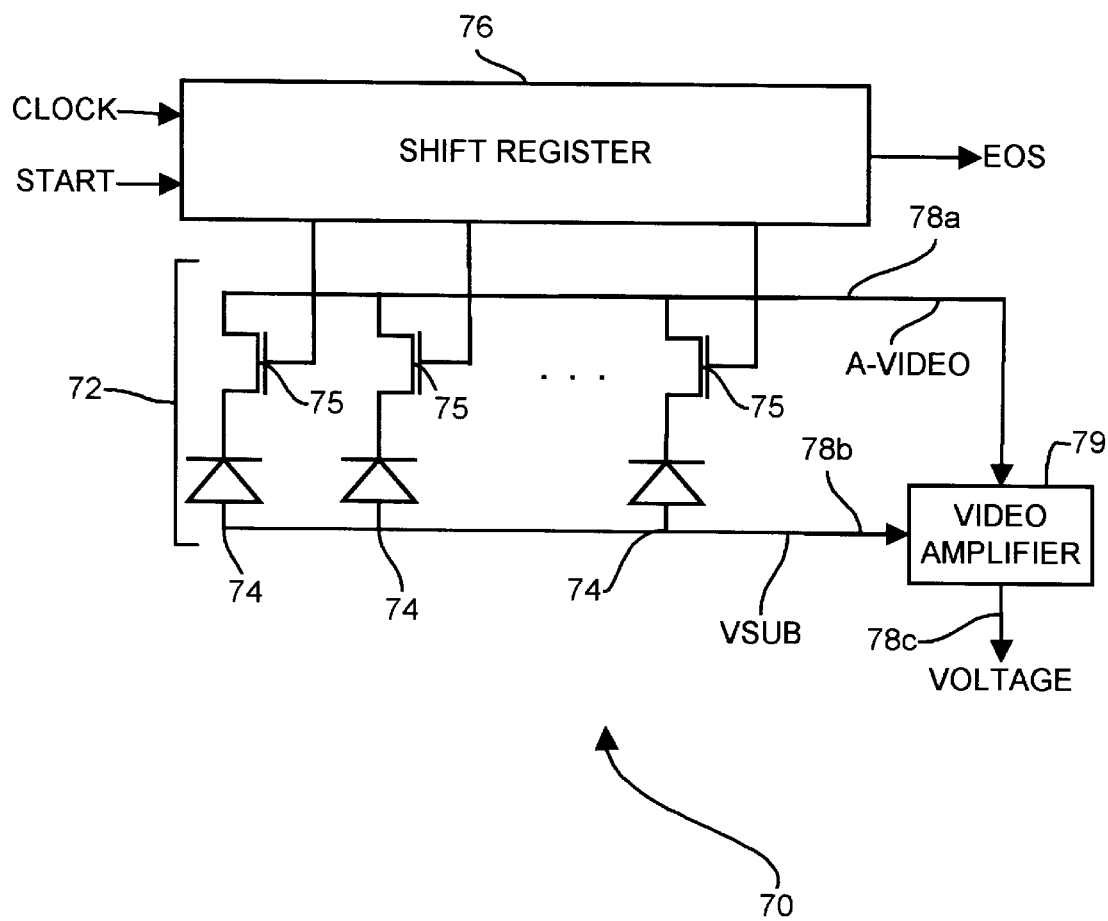
FIGS. 4A and 4B are schematic representations of typical discrete response position sensitive detector according to the prior art.

FIG. 4A illustrates a typical DRPSD 70 according to the prior art that is composed of an array 72 of active photodiodes 74 and MOSFET transistors 75 that are connected to a shift register 76. The shift register 76 receives as input a CLOCK and a START signal.

The START signal is used to initiate the reading of the array 72 of photodiodes 74. A new START signal can be send to the shift register 76 immediately after all the photodiodes 74 have been read or after a prescribed waiting period. This prescribed waiting period is called the integration time and is a function of the specific application. Once the CLOCK signal has been activated by the START signal, each MOSFET transistor 75 is allowed to connect its associated photodiode 74 to a VIDEO line 78a. Each MOSFET transistor 75 is turned on in a sequential manner according to the CLOCK and the START signals.

The output of the shift register 76 includes an end of scan (EOS) signal, which is generated at the end of the reading of the last photodiode 74 in the array 72.

The array 72 combines a VSUB line 78b with the VIDEO line 78a to produce active video. A video amplifier 79 is connected between the VSUB line 78b and the VIDEO line 78a to convert the charge packed produced by the reading of the photodiodes 74 (through START and CLOCK) to a useful voltage 78c.

In practice, the typical width of each photodiode 74 in the array 72 varies from 4 μm to about 50 μm and the height from 4 μm to about 2500 μm. Array lengths vary between 16 and 10,000 elements or photo-sites. The array 72 and the shift register 76 operate on the principle of charging the photodiodes 74 with suitable bias voltage present on the VIDEO line 78a during the sequential read-out and letting the impinging light discharge (by photon-generated carriers) the junction capacitance. The video amplifier 79 performs the charge-to-voltage conversion.

An amplifier (not shown) can also be combined with each photodiode. The output of the detector 70 is a stream of pulses where the envelope is a function of the laser spot distribution. The time occurrence of the peak on the video signal is directly related to the geometrical position of the laser spot. For example, a 512-photodiode array clocked at 5 MHz yields a maximum spot position measurement rate of about 9.76 kHz, if it is assumed that the laser position can be extracted at a pixel rate of 5 MHz CLOCK frequency in FIG. 4A.

Sub-pixel interpolation is performed by a digital finite impulse response (FIR) filter containing a derivative stage as disclosed in U.S. Pat. Nos. 4,658,368 issued Apr. 14, 1987 titled "Peak Position Detector" and 4,819,197 issued Apr. 4, 1989 titled "Peak Detector and Imaging System" both references herein incorporated by reference. The output of the filter is used to interpolate the zero-crossing of the signal. A validation step is added to eliminate false detection.

The maximum peak position extraction rate is achieved by allowing the imaged laser spot to extend over a number of photodiodes. An operator provides the attenuation of low and high frequency noise and of the frequency components induced by the clocks used to address and read each photodiode of the array. Immunity to interfering light sources (artificial or natural, e.g., the sun) or even from multiple reflection of a laser source itself is critical for achieving a robust peak detection.

Figure 4B:
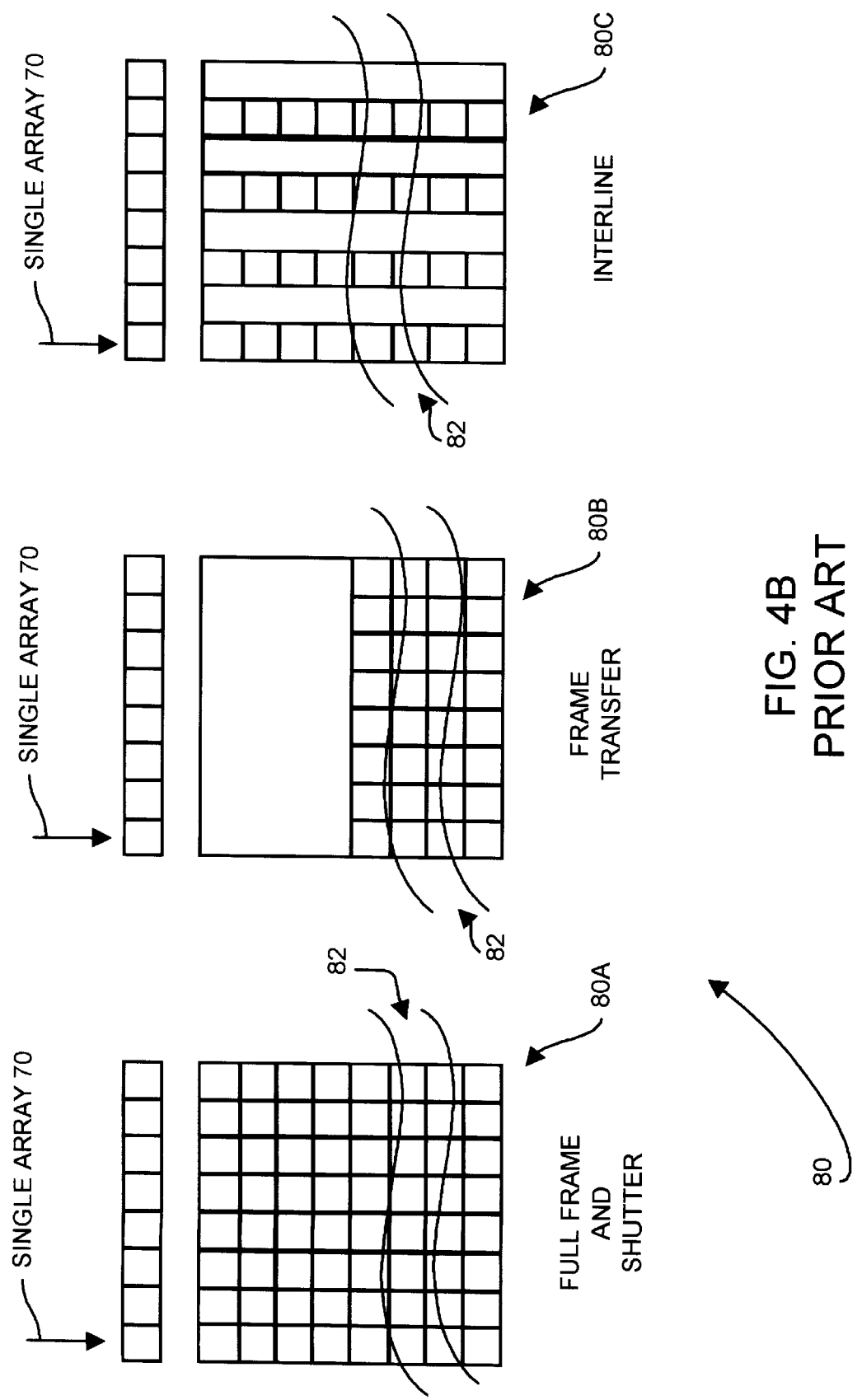

FIG. 4B illustrates an example of multiple light spot detection 80 using a DRPSD according to the prior art. In this arrangement processing multiple light spots (arranged in a line 82) are processed. The same measurement principles described in relation the sensor 70 of FIG. 4A are applied to an array of arrays as illustrated in FIG. 4B. Each array is stacked together to form a bi-dimensional array.

This type of array of photodiodes (or photosensitive elements: pixel) are read using configurations such as a full frame and shutter arrangement 80A, a frame transfer arrangement 80B, and an interline arrangement 80C. The choice of configuration (80A–C) depends on the application. The same processing steps as described for the single array 70 are applied to each column of the bi-dimensional array 80A–C. The light profile 82 is projected along the lines of the bi-dimensional array 80A–C.

Figure 5B:
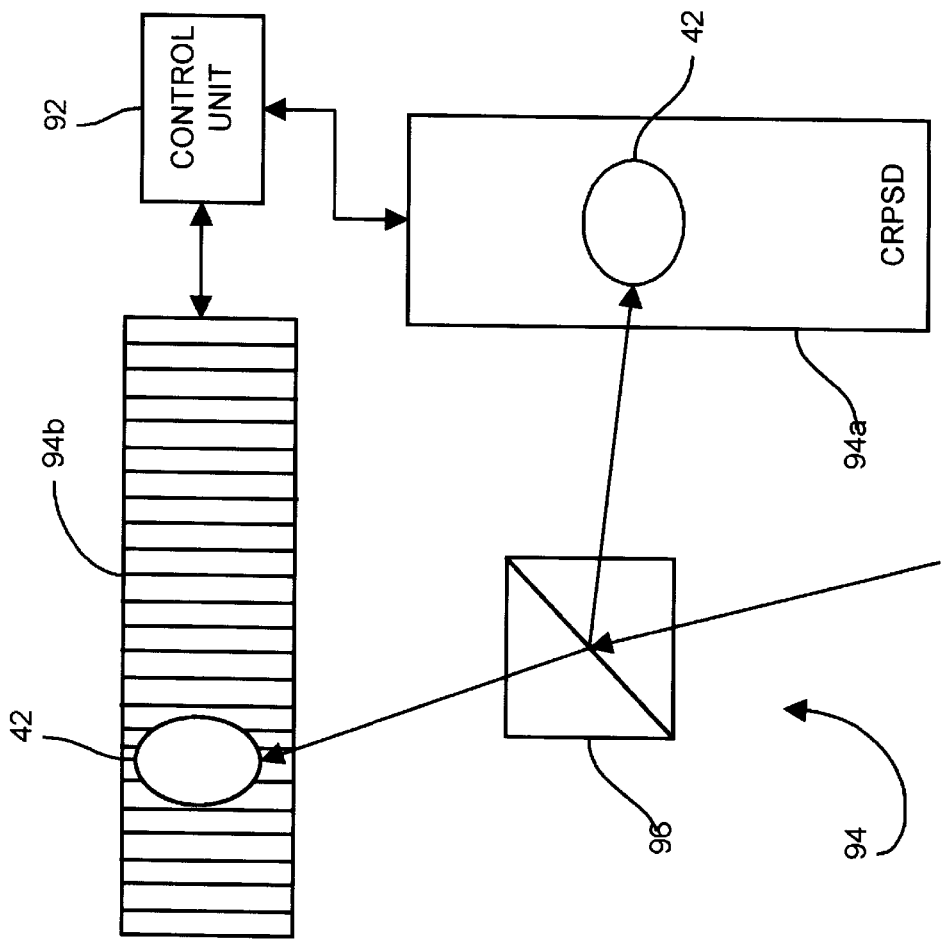
Figure 5A:
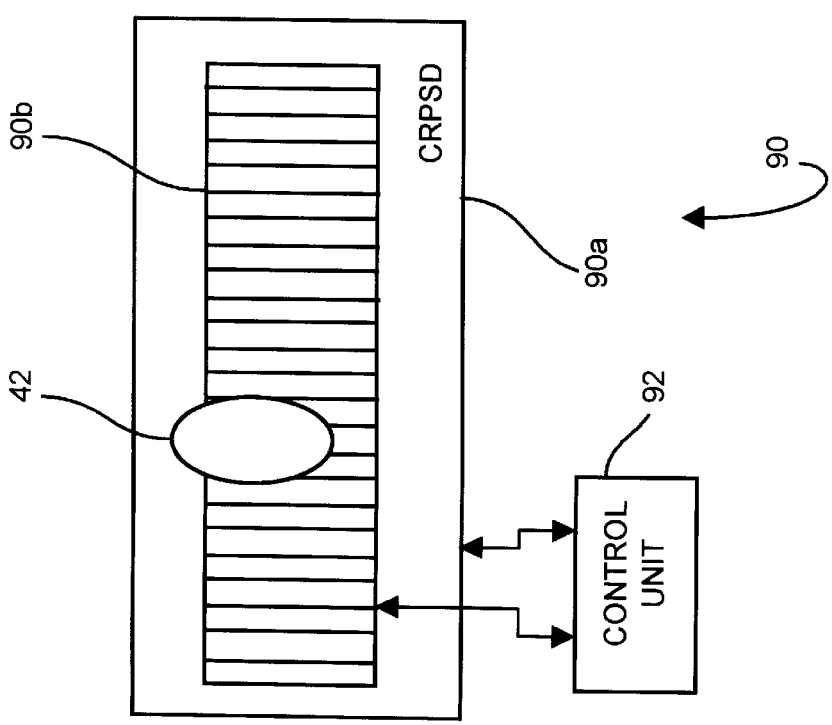

To obtain an accurate, high resolution position measurement at high speed the present invention combines the principles of a CRPSD and a DRPSD. In general, for a single light spot, single wavelength (λ) incident light the following steps are performed to obtain the centroid ($x_c$) of a light distribution that includes the light spot:

(a) illuminate a CRPSD and a DRPSD either directly (as shown in FIGS. 5A, 5C and 5E) or optically (as shown in FIGS. 5B and 5D) with a light source, further detail of these illumination schemes is discussed hereinbelow;

(b) calculate an initial centroid estimate P of the light distribution using a CRPSD (e.g. point A in FIG. 2), using equation (1)-ratio of currents discussed in conjunction with the CRPSD 40 of FIG. 3A;

(c) define a reading window (e.g. window 32 in FIG. 2) around the initial centroid estimate P (e.g. point A in FIG. 2); and (d) calculate a final centroid (e.g. point B is FIG. 2) by processing the defined reading window around the initial centroid estimate P using DRPSD processing as discussed in conjunction with FIG. 4A. For example, according to the reading window, read the array 72 of photo-diodes 74 inside the reading window and apply discrete position processing as described in conjunction with FIG. 4A.

EXAMPLE

A DRPSD with N=512 photo-elements and a CLOCK=10 MHz. The spot size is known in terms of width (equivalent in photo-elements) e.g. 8. A window size of M=32 is defined. Therefore, the CRPSD has to find the location of the peak to a resolution of only 512/32=16 levels or using 4 bits of a binary number. If the DRPSD has to read only M=32 photo elements as opposed to the full 512 then the peak detection speed has increased 16 fold. If instead a window of 16 is used, then 5 bits are required on the CRPSD and the speed increase of the DRPSD is 32-fold. The resolution of the DRPSD is always the same—it is limited by the discrete position processing (as discussed in conjunction with FIG. 4A) or speckle noise and it is typically 1/64 of a pixel over the full resolution of the DRPSD.

FIG. 5A illustrates a position sensitive light spot detector 90 according to an embodiment of the present invention. The detector 90 includes a transparent CRPSD 90a, as described above in conjunction with FIG. 3B, and a DRPSD 90b that are used to find a centroid of the light distribution 42 impinging on it. The centroid is computed using equations (1) and (7), with reference to FIG. 3A and the accompanying description regarding position sensitive measurement.

The centroid value is passed to a control unit 92 that will select a sub-set of contiguous photo-detectors on a DRPSD (such as the linear DRPSD described above in conjunction with FIG. 4A). The sub-set is located around the estimate of the centroid supplied by the CRPSD. The sub-set is determined by spot size and the method outlined regarding position calculations. The sub-set defines a light distribution of interest that is processed using peak extraction algorithms such as described in previously mentioned U.S. Pat. Nos. 4,658,368 and 4,819,197.

FIG. 5B illustrates a position sensitive light spot detector 94 according to another embodiment of the present invention. The detector 94 includes an optical splitting element 96 to divert light to a CRPSD 94a (as described above in conjunction with FIG. 3A) and a DRPSD 94b (as described above in conjunction with FIG. 4A). The detectors 94a and 94b are used to find a centroid value of the light distribution 42 impinging on it. The centroid value is passed to the control unit 92 as discussed above.

FIG. 5C illustrates a position sensitive light spot detector 98 according to another embodiment of the present invention. The detector 98 includes a CRPSD 98a (as described above in conjunction with FIG. 3A) and a DRPSD 98b (as described above in conjunction with FIG. 4A) arranged in a stack with a spread light spot 42. The detectors 98a and 98b are used to find a centroid value of the light distribution 42 impinging on it. The centroid value is passed to the control unit 92 as discussed above.

FIG. 5D illustrates a position sensitive light spot detector 100 according to another embodiment of the present invention. The detector 100 includes a diffraction grating 102 to divert light to a CRPSD 100a (as described above in conjunction with FIG. 3A) and a DRPSD 100b (as described above in conjunction with FIG. 4A) arranged in a stack. The detectors 100a and 100b are used to find a centroid value of the light distribution 42 impinging on it. The centroid value is passed to the control un it 92 as discussed above.

FIG. 5E illustrates a position sensitive light spot detector 104 according to another embodiment of the present invention. The detector 104 is essentially the FIG. 5A detector 90 implemented for a bi-dimensional application. The detector 104 includes a transparent CRPSD 104a (as described above in conjunction with FIG. 3B), and a DRPSD 104b (as described above in conjunction with FIG. 4A) that are used to find a centroid value of the light distribution 42 impinging on it. The centroid value is passed to the control unit 92 as discussed above.

Figure 5F:
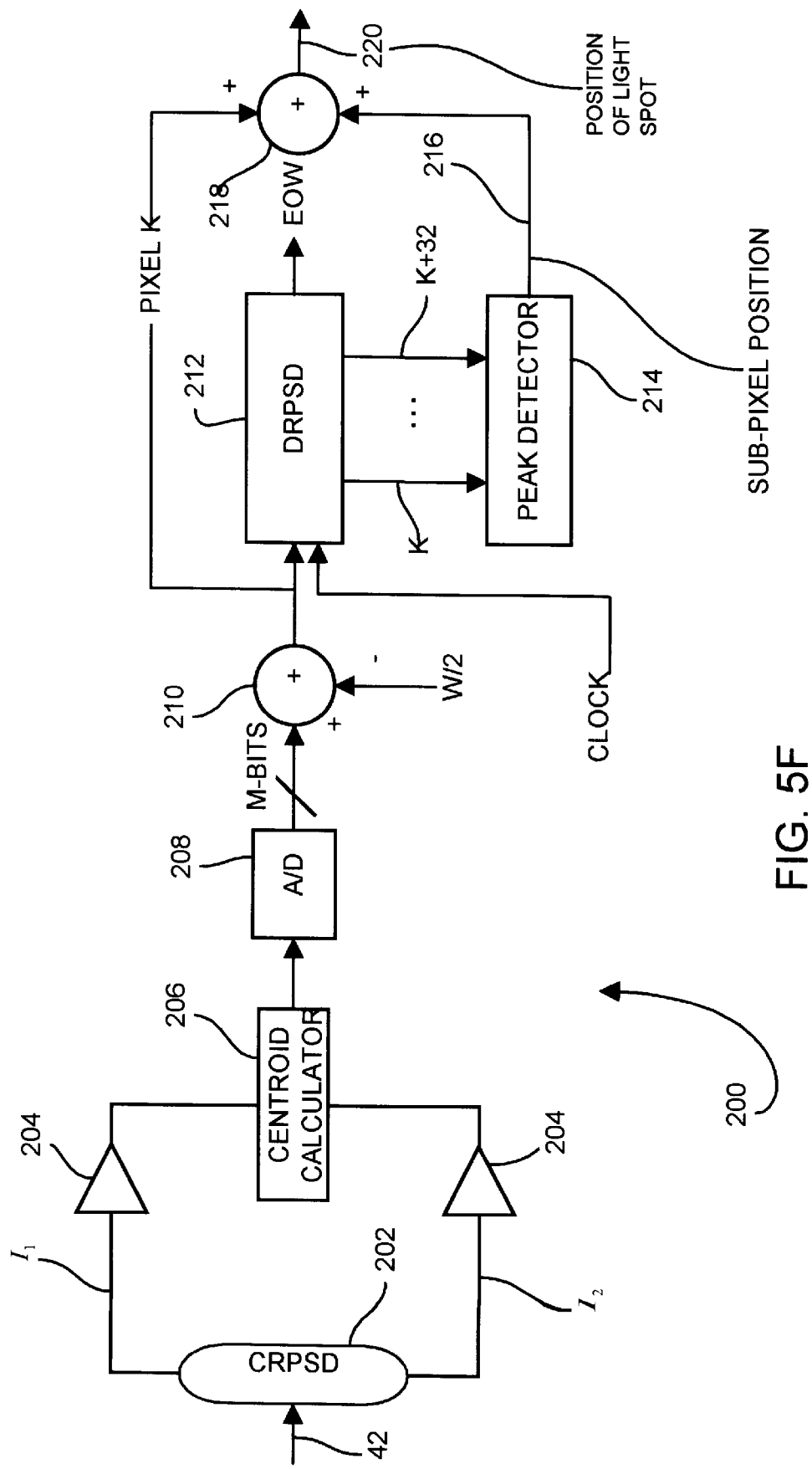
FIG. 5F is a schematic representation of an apparatus used to implement the light spot detectors illustrated in FIGS. 5A–5E.

FIG. 5F illustrates a schematic representation of an implementation of the detector schemes of the present invention illustrated in FIGS. 5A–5E. The light distribution 42 impinging on a CRPSD 202 (e·g. CRPSDs 90a, 94a, 98a, 100a, 104a) produces currents $I_1$ and $I_2$. The currents $I_1$, and $I_2$ pass through amplifiers 204 for conditioning before being processed by a centroid calculator 206 to produce an analog output signal of the centroid of the light distribution (termed a centronic signal).

The centronic signal is converted to a digital signal by an analog-to-digital converter 208 using M bits of resolution, where M is selected based on the application (for example, M is typically between 8 and 32 bits). The digital signal (having M bits of resolution) indicates the approximate position of a desired light spot within the light distribution (see also FIG. 2).

The digital signal output of the A/D converter 208 having M bits of resolution is shifted using an adder 210 by, for example, W/2 pixels where W is a predetermined window size. A DRPSD 212 reads the pixel output of the adder 210 starting at pixel K (where K is the result of the previous operation) to pixel K+32, for example. At pixel K+32 an EOW (end-of-window signal) is generated to signal that the spot location can be computed.

The 32 pixels read are passed through a peak detector 214 to produce a sub-pixel position 216. (using standard peak detector circuit processing as disclosed in previously mentioned U.S. Pat. Nos. 4,658,368 and 4,819,197.) The resulting sub-pixel position 216 is added to the pixel start value K using an adder 218 to produce the position 220 of the desired light spot. In summary, the peak detector 214 is a circuit for detecting a centroid (i.e. the desired light spot in the light distribution) based on determining a peak of the digital signal representation of a first centroid (i.e. the centronic signal—a-centroid of the entire light distribution determined using a CRPSD).

For multiple wavelength ($\lambda$) (e.g. RGB color) processing, a CRPSD is used to estimate the spot position by performing a weighted average of the peak location associated to each $\lambda$. The weights are determined with the intensity of the impinging light at each $\lambda$. The weighted spot position estimate is passed to a DRPSD(s). If the spots are measured with discrete sensors then a weighted average is not required and the single spot case is used instead.

Figure 6A:
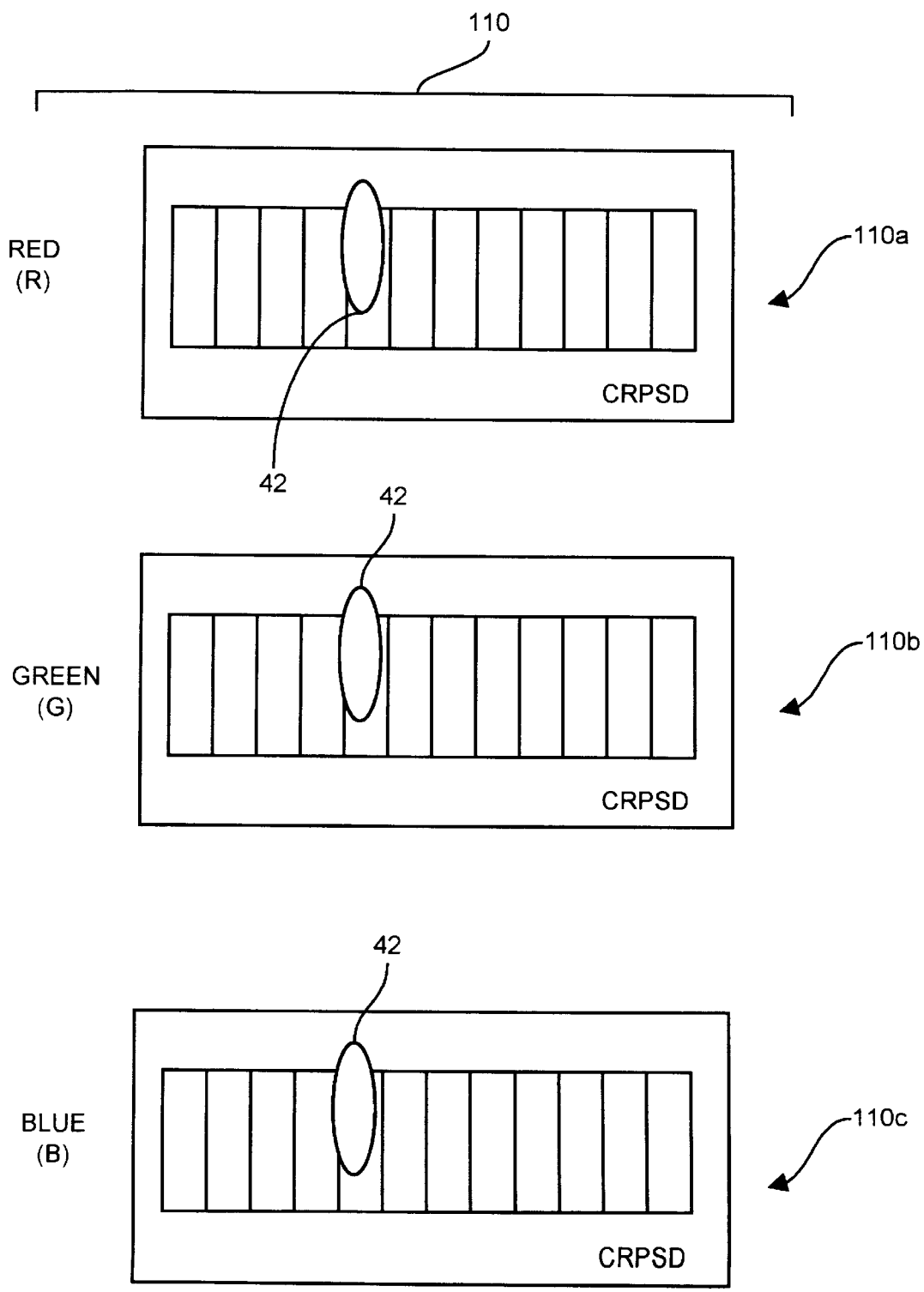
FIGS. 6A and 6B are schematic representations of position sensitive light spot detectors for multiple wavelengths (i.e. colour RGB) according to embodiments of the present invention for multiple/colour light spot applications.

FIG. 6A illustrates a schematic representation of a position sensitive RGB light spot detector 110 according to another embodiment of the present invention. The detector 110 consists of a combination DRPSD/CRPSD detector 90 as shown in FIG. 5A for each wavelength under consideration: e.g. one for red (R) 110a, green (G) 100b and blue (B) 110c.

Figure 6B:
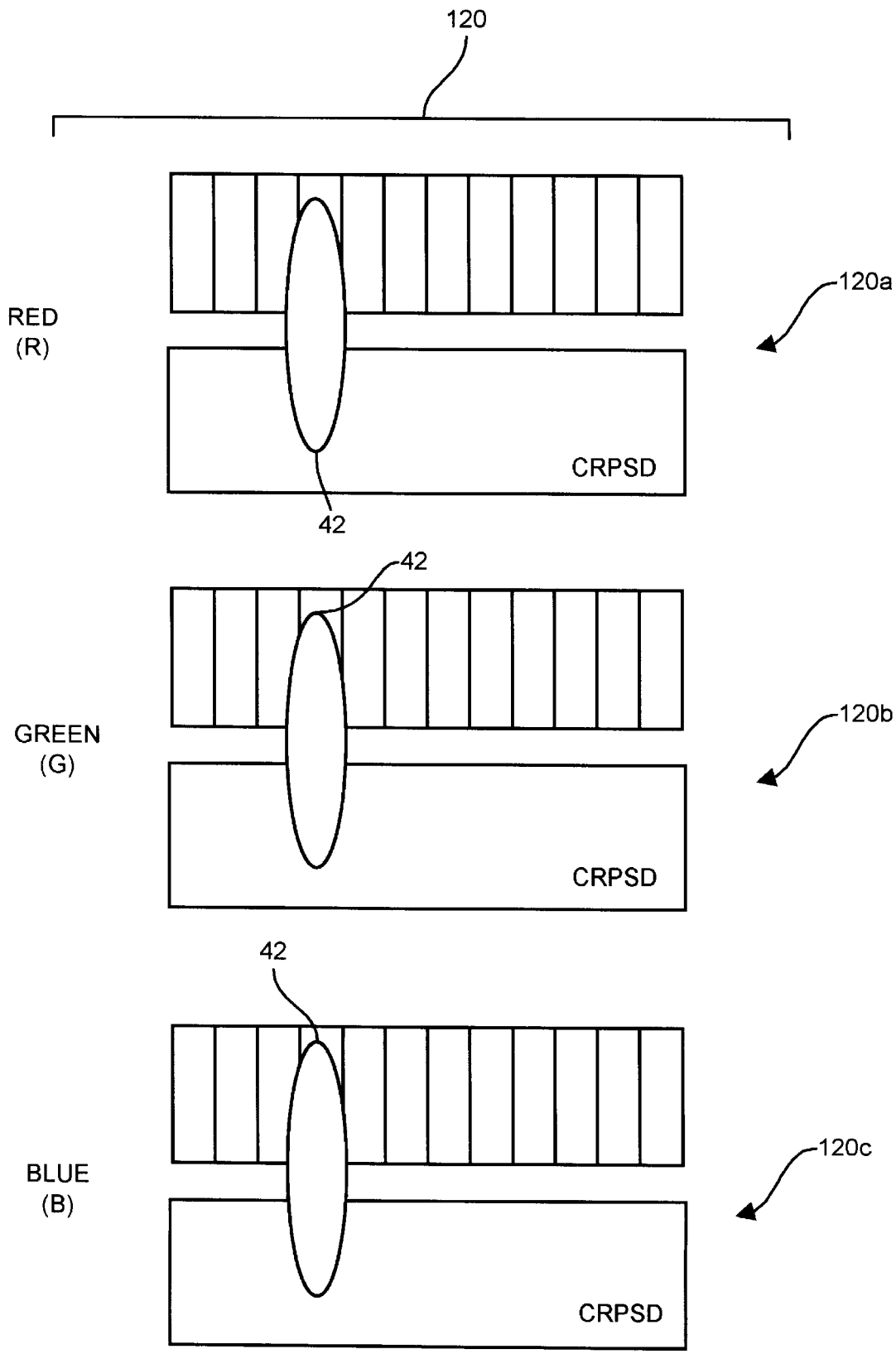

FIG. 6B illustrates a schematic representation of a position sensitive RGB light spot detector 120 according to another embodiment of the present invention. The detector 120 consists of a combination DRPSD/CRPSD detector 98 as shown in FIG. 5C for each wavelength under consideration: e.g. one for red (R) 120a, green (G) 120b and blue (B) 120c.

Figure 6C:
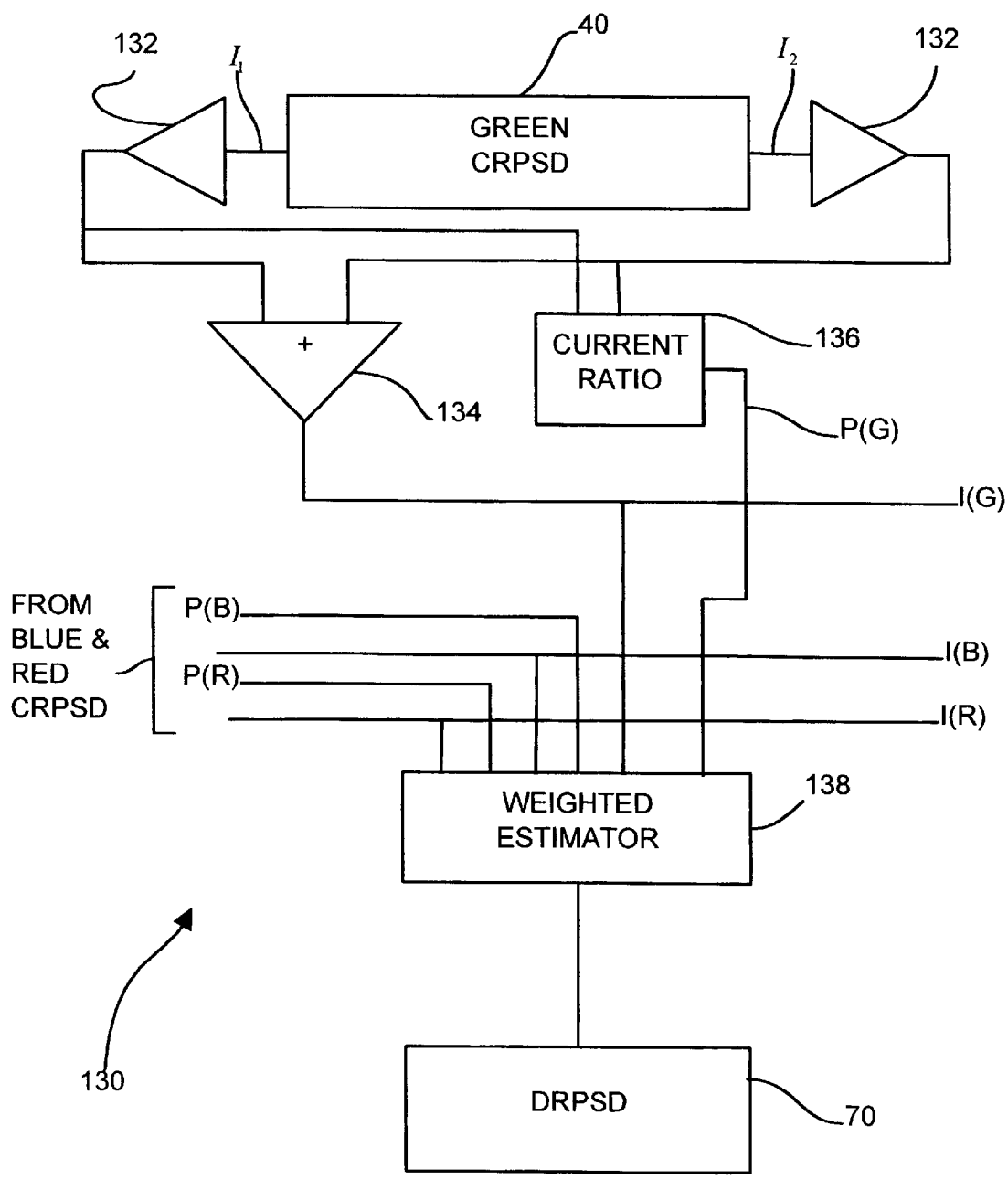
FIG. 6C is a detailed schematic representation of a position sensitive light spot detector for multiple wavelengths (i.e. colour RGB) according to another embodiment of the present invention.

FIG. 6C illustrates a detailed schematic of a position sensitive RGB light spot detector 130 according to another embodiment of the present invention. The detector 130 uses a plurality of CRPSD detectors 40 as discussed in FIG. 3A and a DRPSD 70 shown in detail in FIG. 4A. For clarity, only one CRPSD 40 is shown in FIG. 6C.

The CRPSD 40 is used to extract an estimate of the spot position that is determined accurately by the DRPSD 70. Considering one wavelength (for example green), an estimate of a desired spot light is determined according to the method discussed previously. The CRPSD 40 generates two currents $I_1$ and $I_2$ that are passed through amplifiers 132. The sum of the two currents $(I_1+I_2)$, as calculated by an adder 134, provides an intensity I(G) of the impinging green light. The ratio of the two currents (see equation (1), as calculated by a current ratio device 136, provides a position P(G) of the desired green light spot.

A weighted estimator 138 receives the three intensities I(G), I(B) and I(R) and the three spot positions P(G), P(B), and P(R). The three positions P(G), P(B) and P(R) are combined to form a single estimate of the spot position that is used to activate the DRPSD 70 (which includes the shift register 76, photo-diodes 74, amplifier 79 etc).

The weights are computed according to the minimum variance technique. Given the variance of the three spots P(G), P(B) and P(R) as $\tau_r^2, \tau_g^2, \tau_b^2$ then the best spot position is defined by equation (11):

$$p = \frac{\frac{1}{\tau_g^2}}{\Sigma} p_g + \frac{\frac{1}{\tau_r^2}}{\Sigma} p_r + \frac{\frac{1}{\tau_b^2}}{\Sigma} p_b, \text{ where } \Sigma = \frac{1}{\tau_g^2} + \frac{1}{\tau_r^2} + \frac{1}{\tau_b^2} \quad (11)$$

The variance is proportional to the intensity of the three signals I(G), I(B) and I(R) and is defined by equation (12):

$$\tau_g^2 = K_g I_g^2, \tau_r^2 = K_r I_r^2, \tau_b^2 = K_b I_b^2 \quad (12)$$

Using equations (11) and (12), the weighted estimator 138 provides a good estimate of the location of the spot light to DRPSD 70. In particular, this information is used to setup the shift register 76 of the DRPSD 70.

A window with a preprogrammed width is centered around the estimate of the spot light. Only those pixels in the photo-element array 72 of the DRPSD 70 will be extracted and processed. The processing steps, as described previously in the section titled "Position Sensitive Detector for Single Light Spot Measurement", are performed. When the targeted pixel located around the estimated spot light are extracted and processed, the pixels in the photo-element array 72 of the DRPSD 70 are reset. This makes the DRPSD 70 ready for the next spot measurement.

Figure 6D:
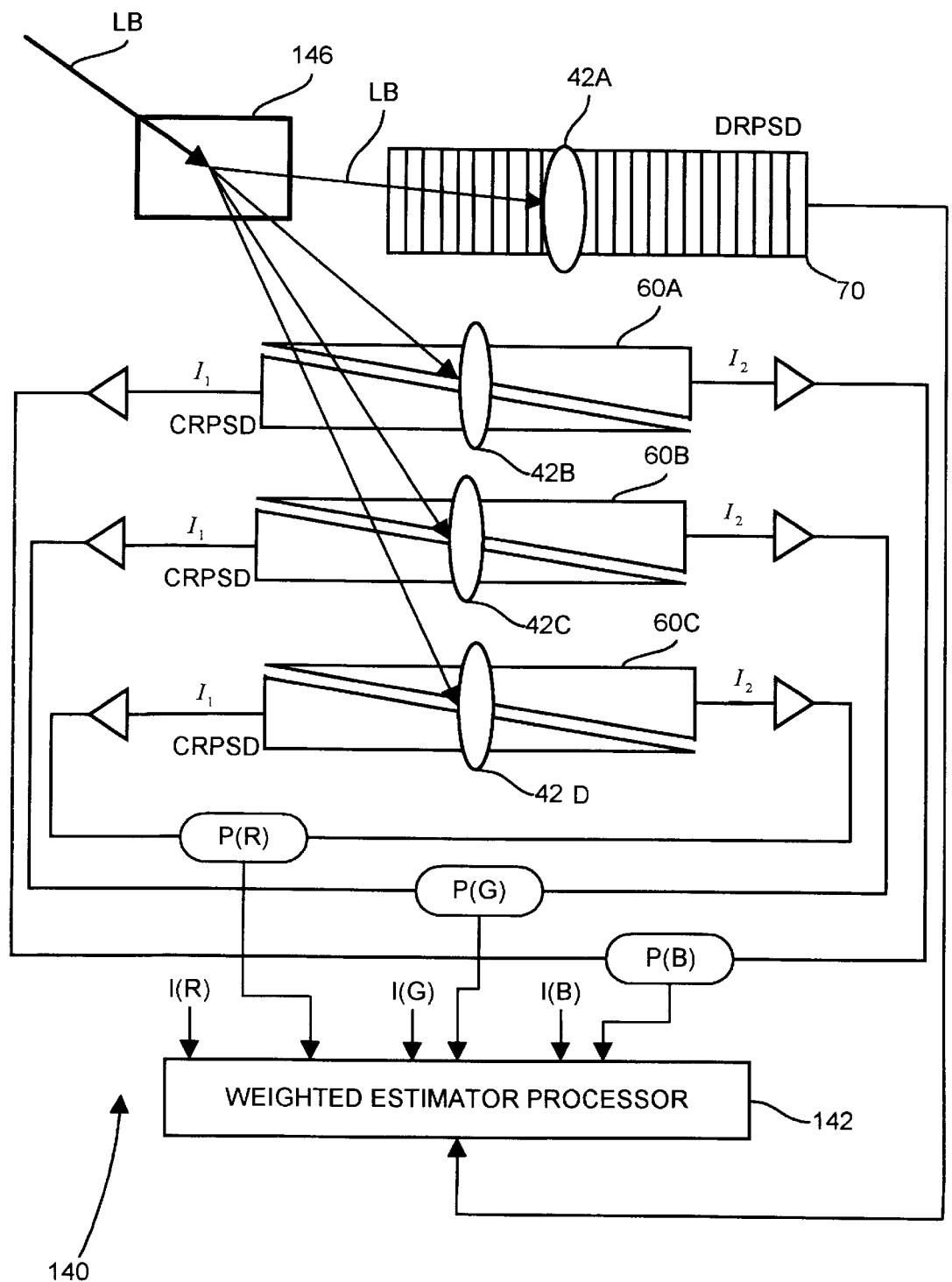
FIG. 6D is a detailed schematic representation of a position sensitive light spot detector for multiple wavelengths (i.e. colour RGB) for use as a sensor in a digital color-3D imaging camera according to another embodiment of the present invention.

FIG. 6D illustrates a position sensitive RGB light spot detector 140 according to another embodiment of the present invention. The detector 140 uses a plurality of split CRPSD detectors 60 (designated as 60A, 60B and 60C) as discussed in FIG. 3C and a DRPSD 70 shown in FIG. 4A.

An optical element 146 is used to separate a light beam LB into two parts. The first part is the unaltered light beam LB that passes straight through the optical element 146 and lands on the DRPSD at 42A. The other part of the light beam LB is decomposed into different wavelengths (red, green and blue) in this example. The different wavelengths land on a respective CRPSD 60A–C at 42B, 42C and 42D.

The currents ($I_1$ and $I_2$) generated by the three CRPSDs 60A–C are processed to obtain position values P(R), P(G) and P(B) and are processed (together with respective intensity values I(R), I(G) and I(B)) by a weighted estimator 142 as described in conjunction with FIG. 6C.

What is claimed is:

1. An apparatus for detecting a position of a light spot in a light distribution comprising:
   (a) means for determining a first centroid of the light distribution; and
   (b) means for determining a second centroid of the light distribution within a reading window defined about the first centroid and within the light distribution, said second centroid being the position of the light spot in the light distribution.

2. The apparatus of claim 1, wherein the means for determining the first centroid of the light distribution includes:
   (i) a continuous response position sensitive detector having N photo-elements for receiving the light distribution and producing a first and a second photo-current; and
   (ii) means for calculating the first centroid based on the first and second photo-currents.

3. The apparatus of claim 2, wherein the first centroid is defined by:

$$P = \frac{I_2 - I_1}{I_1 + I_2}, P \in [-1, 1]$$

where P represents the centroid and $I_1$, and $I_2$ represent the first and second photo-currents respectively.

4. The apparatus of claim 2, further comprising:
   (i) an analog-to-digital converter for converting the first centroid into a digital representation; and
   (ii) an adder for shifting the digital representation of the first centroid by a predetermined amount based on the reading window.

5. The apparatus of claim 4, wherein the means for determining the second centroid includes:
   (i) a discrete response position sensitive detector for reading M photo-elements, wherein M represents a size of the reading window and M is less than N; and
   (ii) a circuit for detecting the second centroid based on determining a peak of the digital representation of the first centroid.

6. The apparatus of claim 2, wherein the continuous response position sensitive detector is a transparent lateral effect photo-diode having a first sensor and a second sensor whereby the light distribution passes through the first sensor to the second sensor.

7. The apparatus of claim 2, wherein the continuous response position sensitive detector is a split sensor having a pair of spaced apart wedges to reduce thermal noise whereby the light distribution impinges the pair of spaced apart wedges and wherein each wedge generates one of the respective first and second photo-currents.

8. The apparatus of claim 5, wherein the continuous response position sensitive detector is transparent and overlays the discrete response position sensitive detector.

9. The apparatus of claim 5, further comprising a beam splitter for splitting the light distribution between the continuous response position sensitive detector and the discrete response position sensitive detector, wherein the continuous response position sensitive detector and the discrete response position sensitive detector are separated.

10. The apparatus of claim 5, further comprising a diffraction grating for directing the light distribution between the continuous response position sensitive detector and the discrete response position sensitive detector, wherein the continuous response position sensitive detector and the discrete response position sensitive detector are separated.

11. An apparatus for detecting a position of a multiple wavelength light spot in a light distribution comprising the apparatus of claim 1 for each wavelength and means for computing a first estimate of the centroid of the multiple wavelength light spot.

12. The apparatus of claim 11, wherein the multiple wavelength light spot is composed of a red (R,r) wavelength component, a green (G,g) wavelength component, a blue (B,b) wavelength component and wherein the means for determining the first centroid of the light distribution includes:

(i) a continuous response position sensitive detector having N photo-elements for receiving the light distribution and producing a first and a second photo-current; and (ii) means for calculating the first centroid based on the first and second photo-currents.

13. The apparatus of claim 12, wherein the first centroid for each wavelength component (R,G,B) is defined by:

$$P = \frac{I_2 - I_1}{I_1 + I_2}, P \in [-1, 1]$$

where P represents the centroid and $I_1$ and $I_2$ represent the first and second photo-currents respectively for each wavelength component (R,G,B) where $p_r$, $p_g$ and $p_b$ represent light spot positions for each wavelength component and $I_r$, $I_g$ and $I_b$ represent wavelength intensities value for each wavelength component and where $I_{r,g,\,or\,b} = I_1 + I_2$.

14. The apparatus of claim 13, wherein the means for computing includes a weighted estimator for receiving the wavelength intensities and $I_r$, $I_g$ and $I_b$ and the light spot positions $p_r$, $p_g$ and $p_b$ and generating the first estimate of the centroid of the multiple wavelength light spot, said first estimate being used as input to the means for determining the second centroid.

15. The apparatus of claim 14, wherein the first estimate of the centroid of the multiple wavelength light spot is calculated using:

$$p = \frac{\frac{1}{\tau_g^2}}{\sum} p_g + \frac{\frac{1}{\tau_r^2}}{\sum} p_r + \frac{\frac{1}{\tau_b^2}}{\sum} p_b, \text{ where } \sum = \frac{1}{\tau_g^2} + \frac{1}{\tau_r^2} + \frac{1}{\tau_b^2}$$

where p is the first estimate, $p_g$, $p_r$, $p_b$ represent the position of light spots, and $\tau_r^2$, $\tau_g^2$, $\tau_b^2$ represent a variance of the three light spot positions $p_g$, $p_r$, $p_b$.

16. The apparatus of claim 15, wherein the variance of the three light spot positions are obtained using:

$$\tau_g^2 = K_g I_g^2, \tau_r^2 = K_r I_r^2, \tau_b^2 = K_b I_b^2$$

where $K_{g,r,b}$ represent a width of the reading window.

17. A method of detecting the position of a light spot in a light distribution comprising the steps of:

(a) calculating a first centroid of the light distribution;

(b) determining a reading window defined about the first centroid and within the light distribution; and (c) calculating a second centroid of the light distribution within the reading window, said second centroid being the position of the light spot in the light distribution.

18. The method of claim 17, wherein step (a) is determined by impinging a first detector with the light. distribution and obtaining a first and a second photo-current where the first centroid is calculated by:

$$P = \frac{I_2 - I_1}{I_1 + I_2}, P \in [-1, 1]$$

where P represents the first centroid and $I_1$ and $I_2$ represent the first and second photo-currents respectively.

* * * * *